US006822767B2

(12) United States Patent
Kawano et al.

(10) Patent No.: US 6,822,767 B2
(45) Date of Patent: Nov. 23, 2004

(54) IMAGE PROCESSING METHOD AND IMAGE PROCESSING APPARATUS

(75) Inventors: Ryuji Kawano, Ibaraki (JP); Jun Asai, Chiba (JP); Yuji Kamiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 677 days.

(21) Appl. No.: 09/897,893

(22) Filed: Jul. 5, 2001

(65) Prior Publication Data

US 2002/0054378 A1 May 9, 2002

(30) Foreign Application Priority Data

Jul. 6, 2000 (JP) ........................................ 2000-205098

(51) Int. Cl.$^7$ .............................. H04N 1/04; G06K 9/40
(52) U.S. Cl. ........................ 358/496; 358/497; 382/261; 382/266
(58) Field of Search ................................. 358/496, 497; 382/261, 266

(56) References Cited

U.S. PATENT DOCUMENTS

| | | | |
|---|---|---|---|
| 5,508,823 A | 4/1996 | Kiyohara et al. | ........... 358/463 |
| 5,933,540 A | 8/1999 | Lakshminarayanan et al. | .. 382/260 |
| 6,122,406 A | * 9/2000 | Okubo | ........................ 382/261 |
| 6,611,360 B1 | * 8/2003 | Kataoka | ..................... 358/461 |
| 2003/0095287 A1 | * 5/2003 | Miyagi et al. | ............... 358/2.1 |

FOREIGN PATENT DOCUMENTS

| | | |
|---|---|---|
| EP | 0 551 861 A2 | 7/1993 |
| EP | 0 871 317 A2 | 10/1998 |

OTHER PUBLICATIONS

U.S. patent application Ser. No. 09/572,833, filed May 18, 2000.

* cited by examiner

*Primary Examiner*—Edward Coles
*Assistant Examiner*—Houshang Safaipour
(74) *Attorney, Agent, or Firm*—Fitzpatrick, Cella, Harper & Scinto

(57) ABSTRACT

In a case where minute dirt is lain between light source and an original, since the light source moves in case of the fixing original reading which is an original reading system of reading an original image by fixing the original, the dirt is momently lighted by the light source and influence by the dirt for the read image is appeared in sight by only a minute dot. However, in case of the shifting original reading of reading the original image by shifting the original, since the relationship between the light source and the dirt is in a fixed state, the light source is always to light the dirt and the influence by the dirt for the read image is appeared in sight by a line or a plane. Therefore, in the present invention, edge emphasis degree of edge emphasis processing for the read image data is varied in accordance with a fact that the original reading system is the fixing original reading or the shifting original reading. Accordingly, the influence by the dirt in the shifting original reading can be reduced.

8 Claims, 6 Drawing Sheets

FIG. 5

FILTER X OF HIGHER EDGE EMPHASIS DEGREE

| 0 | 2 | -6 | -12 | -6 | 2 | 0 |
|---|---|---|---|---|---|---|
| 2 | -21 | -45 | -43 | -45 | -21 | 2 |
| -6 | -45 | 22 | 117 | 22 | -45 | -6 |
| -12 | -43 | 117 | 268 | 117 | -43 | -12 |
| -6 | -45 | 22 | 117 | 22 | -45 | -6 |
| 2 | -21 | -45 | -43 | -45 | -21 | 2 |
| 0 | 2 | -6 | -12 | -6 | 2 | 0 |

FILTER Y OF LOWER EDGE EMPHASIS DEGREE

| 0 | -2 | -5 | -6 | -5 | -2 | 0 |
|---|---|---|---|---|---|---|
| -2 | -7 | -6 | -2 | -6 | -7 | -2 |
| -5 | -6 | 18 | 39 | 18 | -6 | -5 |
| -6 | -2 | 39 | 64 | 39 | -2 | -6 |
| -5 | -6 | 18 | 39 | 18 | -6 | -5 |
| -2 | -7 | -6 | -2 | -6 | -7 | -2 |
| 0 | -2 | -5 | -6 | -5 | -2 | 0 |

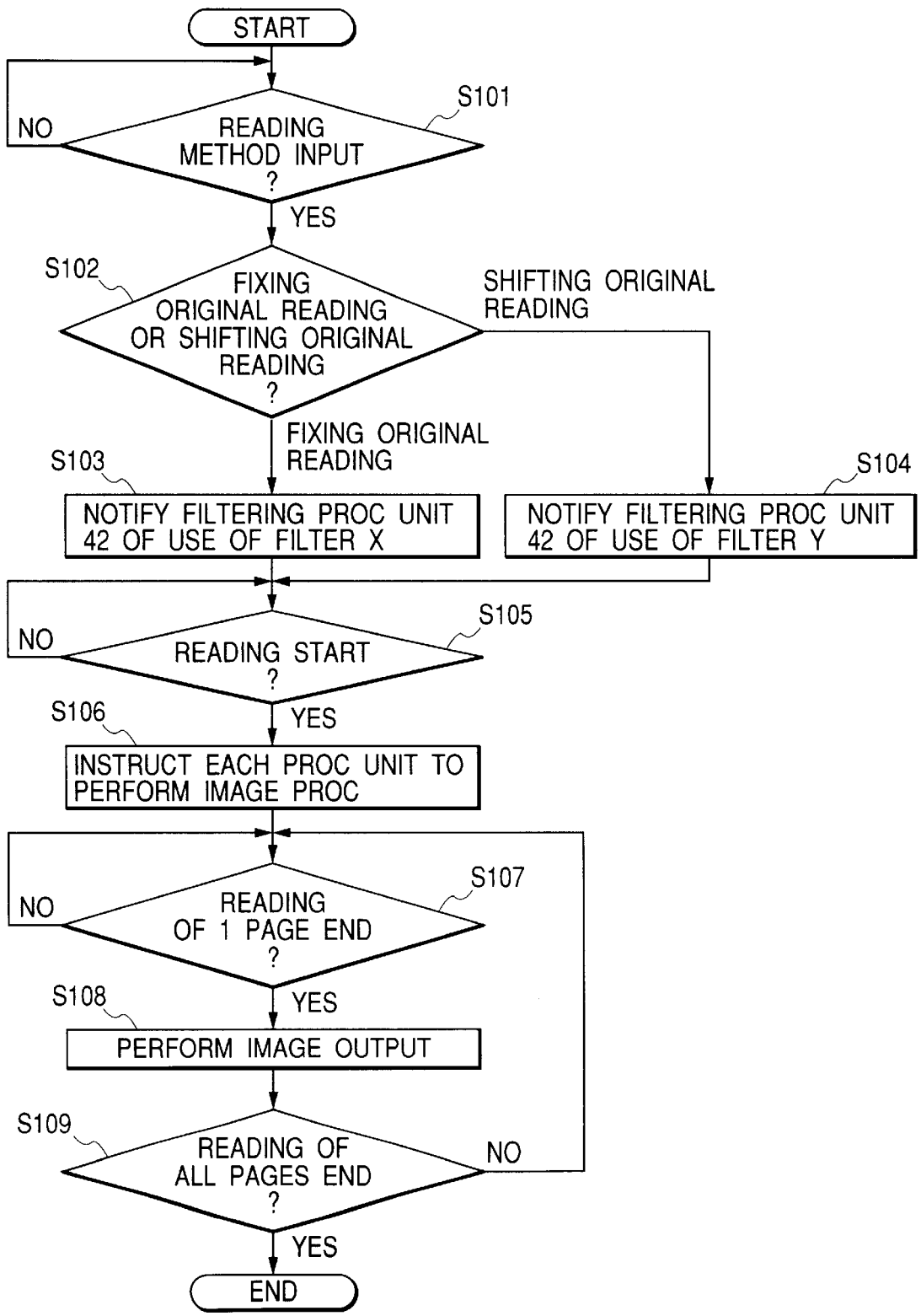

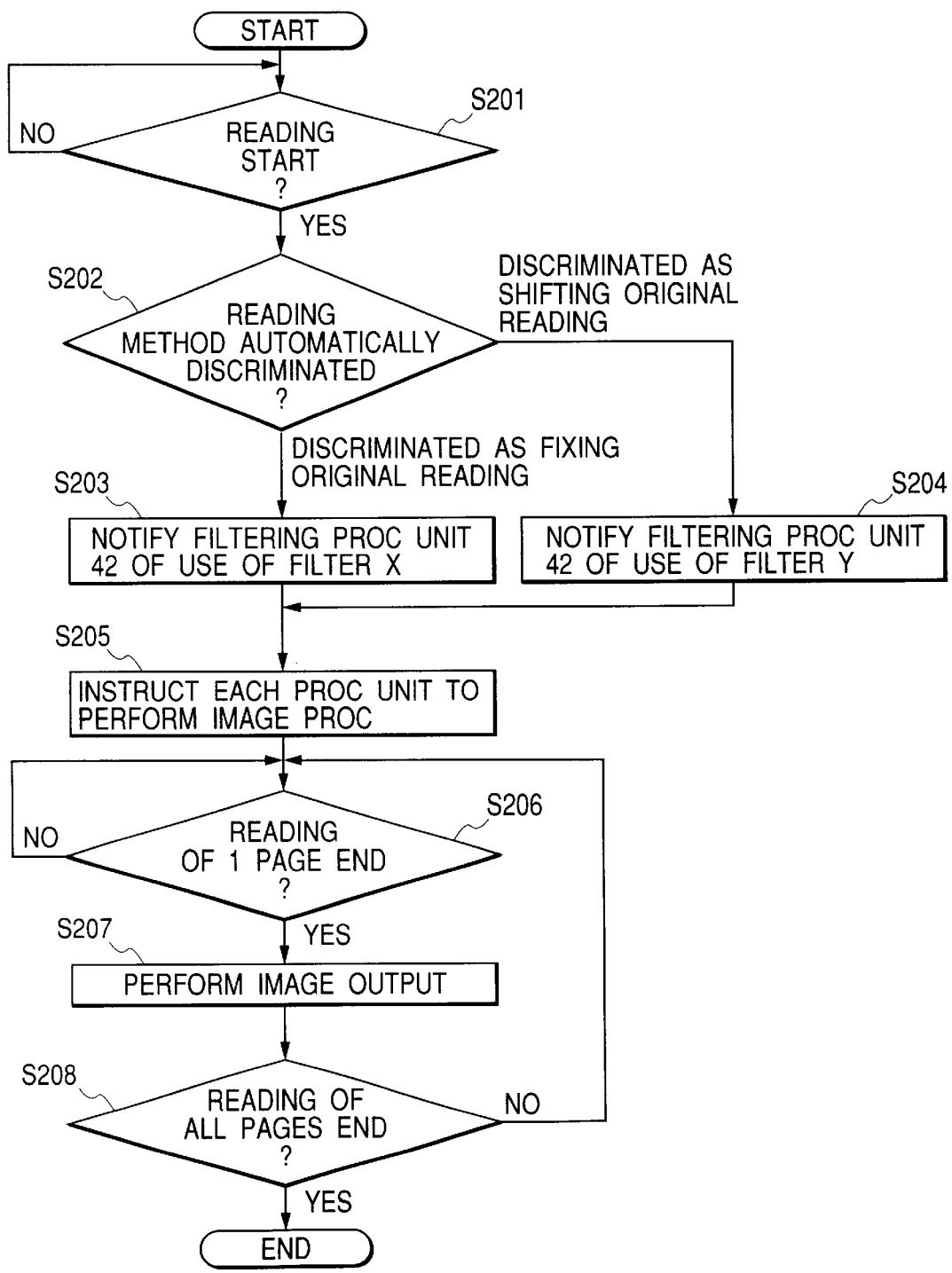

IMAGE PROCESSING METHOD AND IMAGE PROCESSING APPARATUS

BACKGROUND OF THE INVENTION

1. Field of the Invention

The present invention relates to an image processing method and an image processing apparatus for reading original images and performing an image output by executing processing to the read images, and more particularly to an image processing method and an image processing apparatus capable of reading originals by plural reading systems.

2. Related Background Art

Conventionally, in a digital copying machine or a facsimile apparatus, a light beam is irradiated to an original by lighting a light source and reflection light reflected from the original is read to convert it into digital data, then various image processing are executed to the digital data, and an image output has been performed.

Image reading systems in case of reading original images are roughly classified into two systems. One is an image reading system of reading all parts on an original by fixing the original and moving the light source (hereinafter, to be referred as fixing original reading). The other is an image reading system of reading all parts on the original by fixing the light source and shifting the original (hereinafter, to be referred as shifting original reading).

According to a conventional art, in an image processing apparatus capable of using both of the fixing original reading and the shifting original reading, in spite of difference in the image reading system, images were output by always executing the same image processing.

In a case where minute dirt or dust is lain between the light source and the original, since the light source moves in case of the fixing original reading, the dirt is momently lighted by the light source and influence by the dirt for the read image is appeared in sight by only a minute dot. However, in case of the shifting original reading, since the relationship between the light source and the dirt is in a fixed state, the light source is always to light the dirt and the influence by the dirt for the read image is appeared in sight by a line or a plane.

If images are output by executing the same image processing to the images which were read by reading systems of the fixing original reading and the shifting original reading, the output image in case of using the shifting original reading is more influenced by the dirt as compared with the output image in case of using the fixing original reading. That is, in image processing, edge emphasis processing is generally executed by using a digital filter. However, dirt information is also emphasized by the edge emphasis processing. Particularly, in the shifting original reading, there occurred a drawback that the influence by the dirt for the output image is more increased.

SUMMARY OF THE INVENTION

The present invention is to eliminate the above drawback, and an object thereof is to provide an image processing method and an image processing apparatus which can reduce influence by the dirt in case of shifting original reading by varying edge emphasis degree in edge emphasis processing for image data which was read in accordance with a fact that an original reading system is fixing original reading or the shifting original reading.

In order to achieve the above object, the present invention provides an image processing method comprising:

a reading step of reading original images;

a processing step of executing edge emphasis processing to image data from the reading step; and a discrimination step of discriminating if an original reading system in the reading step is fixing original reading for reading an original image by fixing an original or shifting original reading for reading the original image by shifting the original, wherein the processing step varies edge emphasis degree in the edge emphasis processing for image data read in accordance with a discrimination result obtained in the discrimination step.

Further, the present invention provides an image processing apparatus comprising:

a reading means for reading original images to output image data; and a processing means for executing edge emphasis processing to image data from the reading means, wherein the reading means reads originals by any one of original reading system of fixing original reading for reading an original image by fixing an original or shifting original reading for reading the original image by shifting the original, and the processing means varies edge emphasis degree in the edge emphasis processing for the image data which was read in accordance with a fact that the original reading system is the fixing original reading for reading the original image by fixing the original or the shifting original reading for reading the original image by shifting the original.

Further, another object of the present invention is to provide an image processing method and an image processing apparatus which can reduce the influence by the dirt in case of the shifting original reading by executing the edge emphasis processing of which the edge emphasis degree is lower than that of the fixing original reading, in a case where the original reading system is the shifting original reading.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of a filter used by a filtering processing unit;

FIG. 6 is a flow chart indicating a control of filter selection in a first embodiment of the present invention; and FIG. 7 is a flow chart indicating a control of filter selection in a second embodiment of the present invention.

DETAILED DESCRIPTION OF THE PREFERRED EMBODIMENTS

The preferred embodiments of the present invention will now described in detail in accordance with the accompanying drawings.

<First Embodiment>

Figure 1:
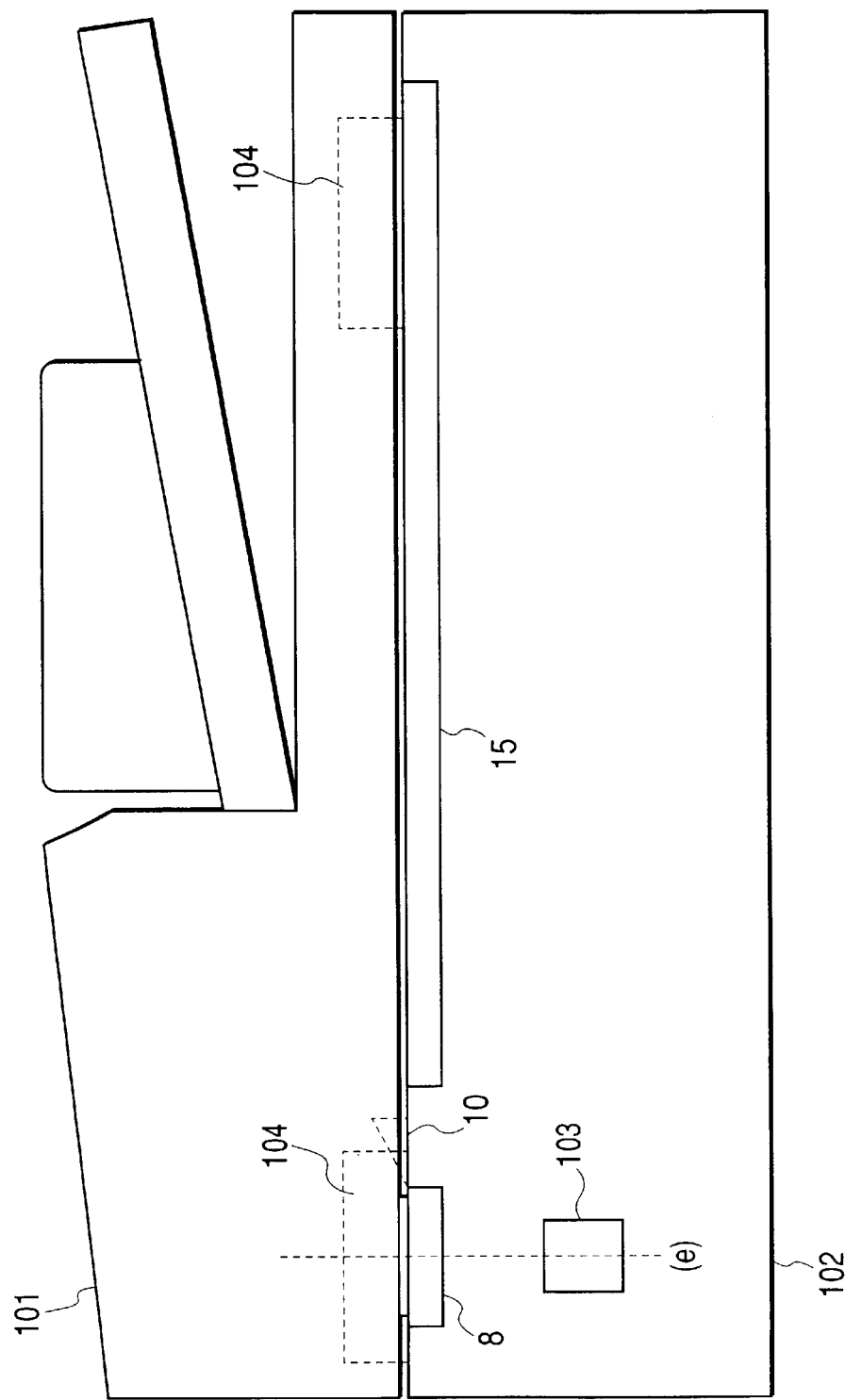
FIG. 1 is a view showing the structure of an image reading system of an image processing apparatus in an embodiment of the present invention.

FIG. 1 is a view schematically showing an image reading system of an image processing apparatus according to a first embodiment of the present invention.

An original processing device 101 is located on an upper position of an image reading device 102 joining each other with hinge units 104. Originals are carried to a reading position (e) on the image reading device 102. The image reading device 102 has a platen glass (small) 8, a platen glass (large) 15, a jump stand 10 and an exposure device 103, which performs an exposure operation.

The platen glass (small) 8 is used in performing an operation with shifting original reading using the original processing device 101. In this case, the exposure device 103 is fixed on the reading position (e). The original processing device 101 carries originals at a predetermined carrying speed, and the exposure operation is performed on the reading position (e).

The platen glass (large) 15 is used in performing an operation of fixing original reading according to use of a compression plate. For the originals put on the platen glass (large) 15, the image reading device 102 performs the exposure operation by shifting the exposure device 103 in the original longitudinal direction.

Figure 2:
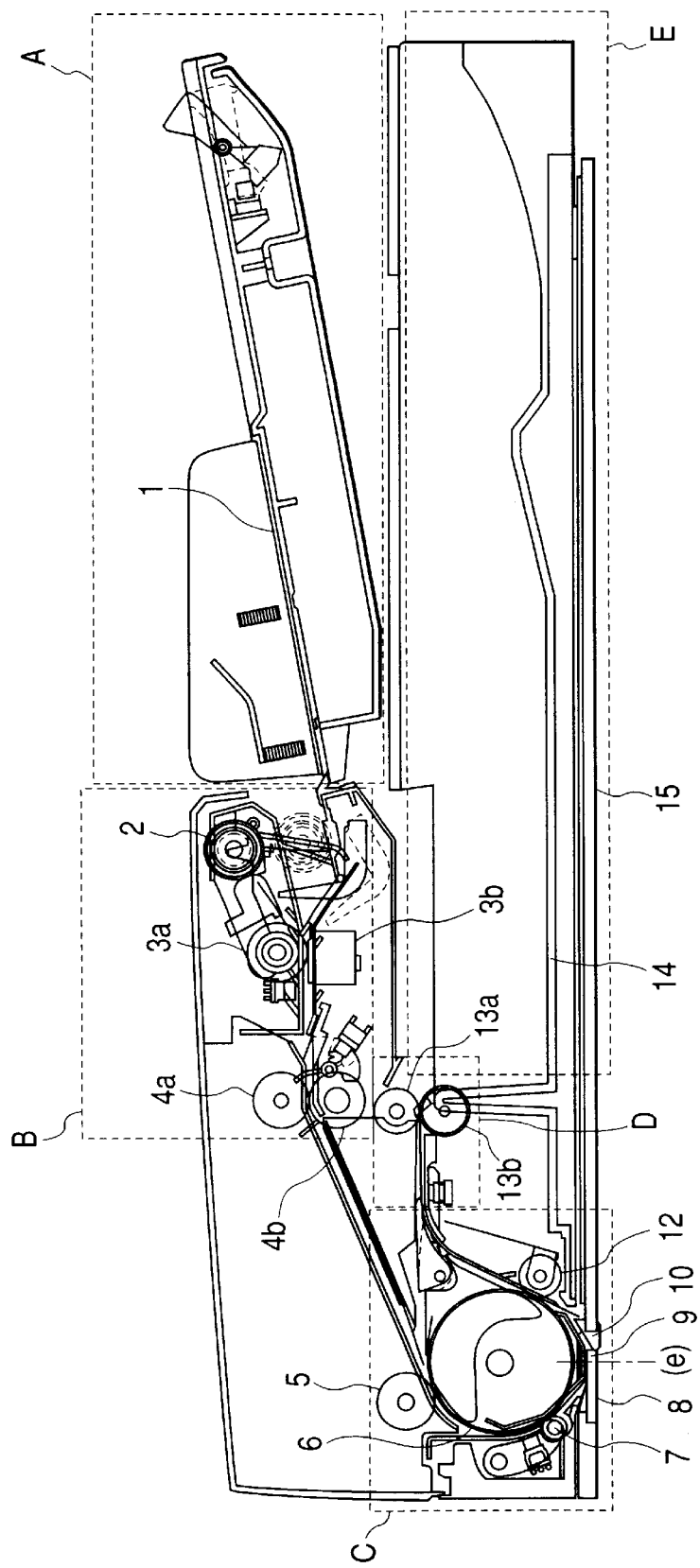
FIG. 2 is a cross-sectional view of an original processing device in the embodiment of the present invention.

FIG. 2 is a cross-sectional view of the original processing device 101 according to a first embodiment of the present invention, and the description thereof will be given below.

An original stacking unit A has a stacking tray 1, on which the originals are stacked.

In an original feed unit B, a pickup roller 2 takes a sheaf of the originals stacked on the stacking tray 1 into a separation unit (composed of rollers 3a and 3b), where the most upper sheet of a sheaf of the originals is separated one by one by the sheet feed roller 3a and the frictional separation pad 3b to carry the separated sheets to a pair of first resist rollers 4a and 4b. The first resist rollers 4a and 4b are stopped at a time of reaching a leading edge of the original, and the original is carried to an original carriage unit C after performing an oblique correction upon forming a loop owing to the carriage by the sheet feed roller 3a.

In the original carriage unit C, the original carried from the original feed unit B is carried at a predetermined speed between the platen glass (small) 8 and a white plate 9 by a lead roller 6, a second resist roller 5, a lead roller I 7 and a lead roller II 12. At this time, the exposure device 103 is fixed under the reading position (e) on the platen glass (small) 8, and the exposure operation is performed.

In an original discharge unit D, during the exposure operation is performed on the reading position (e), a pair of opposite rollers 13a and 13b are separated. However, after terminating a reading operation upon passing a trailing edge of the original through the reading position (e), the roller 13b moves to an upper position, and the original is nipped by the roller 13a and the roller 13b to reversely discharge the original on a discharge tray 14 of a discharged sheet stacking unit E.

Figure 3:
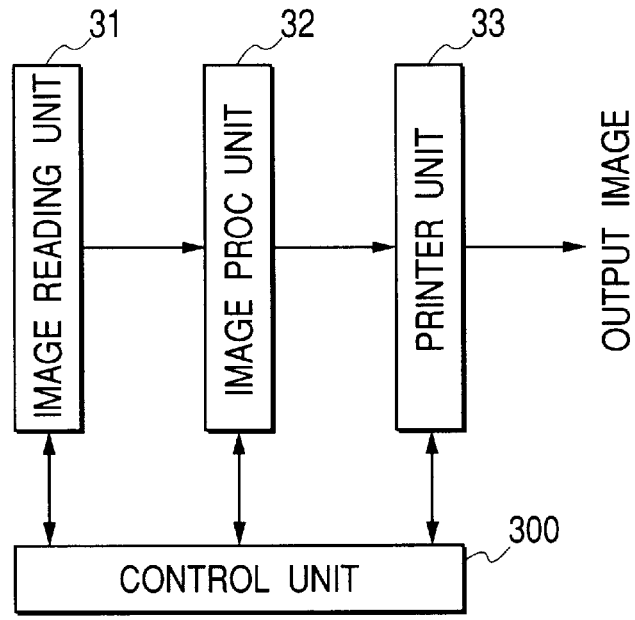
FIG. 3 is a block diagram indicating the structure of the image processing apparatus in the embodiment of the present invention.

FIG. 3 is a block diagram of a digital copying machine mounting the above image reading system.

An image reading unit 31 is composed of the original processing device 101 and the image reading device 102 shown in FIG. 1. After reading an image at the image reading unit 31, image data is processed at an image processing unit 32, and the processed image data is recorded on a recording sheet at a printer unit 33 to be output. A control unit 300 for controlling an entire of the present image processing apparatus is composed of a CPU, a ROM, a RAM and the like.

Figure 4:
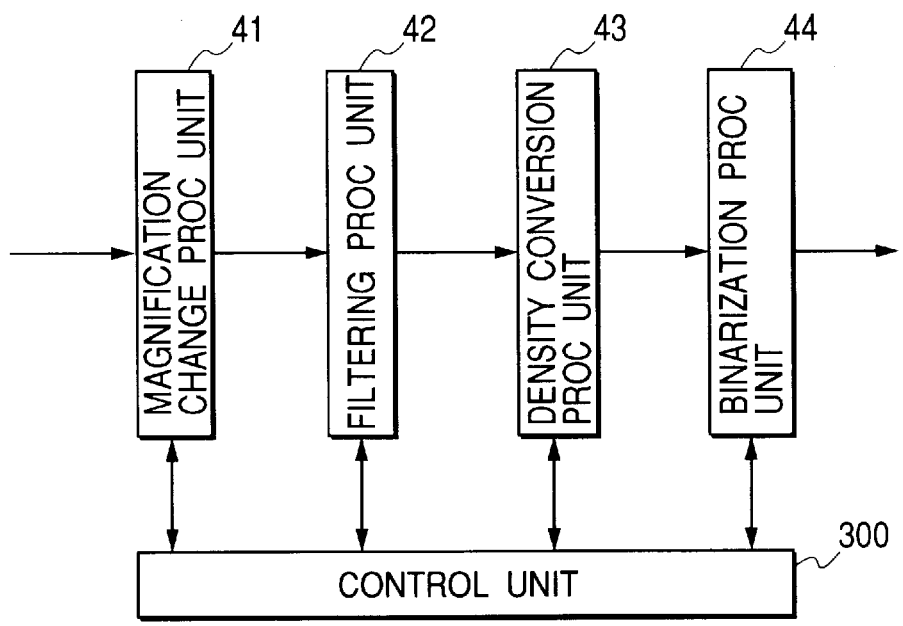
FIG. 4 is a block diagram indicating the details of an image processing unit shown in FIG. 3.

FIG. 4 is a block diagram showing the details of the image processing unit 32. At first, for image data which is input to the image processing unit 32, digital magnification change processing for digitally varying image size is executed in a magnification change processing unit 41.

In a filtering processing unit 42, for image data to which the magnification change processing is executed, digital filtering processing for emphasizing an edge is executed.

In a density conversion processing unit 43, density conversion of image data which is filter processed in the filtering processing unit 42 is performed so as to obtain suitable output density at the printer unit 33.

In a binarization processing unit 44, multi-level image data from the density conversion processing unit 43 is converted into binary image data by a known binarization method such as a dither method, an error diffusion method or the like.

FIG. 5 is a view showing a digital filter used in the filtering processing unit 42 shown in FIG. 4.

In the filtering processing unit 42, the filtering processing is executed by performing an operation of folding the digital filter and the image data by using any of a filter of higher edge emphasis degree or a filter of lower edge emphasis degree shown in FIG. 5. Since a folding operation is conventionally known, the description will be omitted.

In this case, the filter of the higher edge emphasis degree is defined as X, and the filter of the lower edge emphasis degree is defined as Y.

With respect to these filters X and Y, the control unit 300 judges an image reading method, and it is notified that which of the filter is to be used to the filtering processing unit 42 in accordance with the obtained judgment.

(Image Formation Method)

In case of reading originals in the above-structured digital copying machine, two kinds of image reading methods of the fixing original reading and the shifting original reading can be used.

It is assumed that the fixing original reading and the shifting original reading can be selected by an operator from an operation unit (not shown).

Generally, even if any image reading method of the fixing original reading or the shifting original reading is used, image processing is executed in the filtering processing unit 42 by using the filter X. However, only in case of the shifting original reading, it is possible to select that the image processing is to be executed using which of the filter from the filters X and Y.

In the present embodiment, in case of the shifting original reading, it is assumed that the filter Y is selected so as to minimize the influence by the dirt.

In a case where the small dirt adhered to the platen glass (large) 15 or the platen glass (small) 8, in the fixing original reading, since the exposure device 103 moves, a portion influenced by the dirt is extremely small for an entire part of the original. Therefore, even if the influence by the dirt is emphasized by the filter X, the dirt is appeared in sight on an output image by only a small dot, which is not almost recognized. However, in case of the shifting original reading, if the dirt adheres to the platen glass (small) 8 which exists between the original and the exposure device 103, since the exposure device does not move, the influence by the dirt is continuously given during the original is read. Consequently, the influence by the dirt is also emphasized by the filter X, and a black line which does not appear on the original appears on the output image. As a result, the influence by the dirt becomes to be easily recognized.

Therefore, in the first embodiment of the present invention, it is structured to select the filter Y in case of the shifting original reading. Accordingly, the influence by the dirt in case of the shifting original reading becomes not to be easily recognized, thereby realizing to obtain a suitable output image.

FIG. 6 is a flow chart indicating a control of filter selection in the embodiment of the present invention.

The control indicated in this flow chart is performed by the control unit 300 shown in FIGS. 3 and 4.

At first, in a step S101, it is judged whether or no a reading method is input (instructed), until the method is input. If the reading method is input, then it is judged in a step S102 that which of a reading mode of the fixing original reading or the shifting original reading is selected by an operator from the operation unit (not shown). In a case where it is judged that the fixing original reading is selected, the flow advances to a step S103. In a case where it is judged that the shifting original reading is selected, the flow advances to a step S104.

In the step S103, using of the filter X of higher edge emphasis degree is notified to the filtering processing unit 42. The filtering processing unit 42 which received this notification uses the filter X, in case of executing edge emphasis processing according to the folding operation.

In the step S104, using of the filter Y of lower edge emphasis degree is notified to the filtering processing unit 42. The filtering processing unit 42 which received this notification uses the filter Y, in case of executing edge emphasis processing according to the folding operation.

In a step S105, it is judged whether or not a reading operation is started. When the reading operation is started, the flow advances to a step S106, where an execution of processing is instructed to the magnification change processing unit 41, the filtering processing unit 42, the density conversion processing unit 43 and the binarization processing unit 44. In each of the image processing units, necessary image processing is executed for image data sequentially transmitted from the image reading unit 31 on the basis of the instruction from the control unit 300.

In a step S107, it is judged whether or not image reading for one page is terminated. When it is judged that the image reading is terminated, the flow advances to a step S108, where an image output for one page is instructed to the printer unit 33.

The printer unit 33 has a page memory capable of storing image data of at least one page, and when an instruction of the image output is given from the control unit 300, the image data is read from the page memory to output it as a recorded image.

In a step S109, it is judged whether or not reading of all pages of set originals is terminated. If it is not terminated, images are output with a page unit according to processing executed in the steps S107 and S108, and if it is judged that the reading is terminated, the processing is terminated.

<Second Embodiment>

In the second embodiment of the present invention, means for automatically detecting an image reading system is mounted on a digital copying machine of which structure is same as that in the above first embodiment. The means for automatically detecting the image reading system can be achieved by automatically detecting that which of the fixing original reading or the shifting original reading in the original reading system is to be used. As an automatic detection method, in a case where the originals are set on the stacking tray 1 shown in FIG. 2, it is detected as the shifting original reading. In a case where the originals are set on the platen glass 15, it is detected as the fixing original reading.

FIG. 7 is a flow chart indicating a control of filter selection in the second embodiment of the present invention. The control indicated in this flow chart is performed by the control unit 300 shown in FIGS. 3 and 4.

At first, in a step S201, it is judged whether or not a start of reading is selected by an operator from the operation unit (not shown). When it is judged that the start of the reading is selected, the flow advances to a step S202, where a reading system is automatically discriminated.

When it is judged as the fixing original reading by an automatic discrimination, the flow advances to a step S203. When the shifting original reading is selected, the flow advances to a step S204.

In the step S203, using of the filter X of higher edge emphasis degree is notified to the filtering processing unit 42. The filtering processing unit 42 which received this notification uses the filter X, in case of executing the edge emphasis processing according to the folding operation.

In the step S204, using of the filter Y of lower edge emphasis degree is notified to the filtering processing unit 42. The filtering processing unit 42 which received this notification uses the filter Y, in case of executing the edge emphasis processing according to the folding operation.

In a step S205, an execution of processing is instructed to the magnification change unit 41, the filtering processing unit 42, the density conversion processing unit 43 and the binarization processing unit 44. In each of the image processing units, necessary image processing is executed for image data sequentially transmitted from the image reading unit 31 on the basis of the instruction from the control unit 300.

In a step S206, it is judged whether or not image reading for one page is terminated. When it is judged that the image reading is terminated, the flow advances to a step S207, where an image output for one page is instructed to the printer unit 33.

The printer unit 33 has a page memory capable of storing image data of at least one page, and when an instruction of the image output is given from the control unit 300, the image data is read from the page memory to output it as a recorded image.

In a step S208, it is judged whether or not reading of all pages of set originals is terminated. If it is not terminated, images are output with a page unit according to processing executed in the steps S206 and S207, and if it is judged that the reading is terminated, the processing is terminated.

In this manner, according to the second embodiment, the original reading system is automatically detected, and the influence by the dirt in the shifting original reading can be reduced by structuring that the filter Y of lower edge emphasis degree is selected, in case of the shifting original reading.

Filters are not limited to two kinds of the filter X and the filter Y, but plural filters having different edge emphasis degree may be provided, wherein the image processing may be executed using the filter X in the filtering processing unit 42 in case of the fixing original reading, and the image processing may be executed using an arbitrary filter from the plural filters of which the edge emphasis degree is lower than that of the filter X in case of the shifting original reading by detecting that the original reading system is the fixing original reading or the shifting original reading.

Although the present invention is explained according to the embodiments, the present invention is applicable to a system composed of plural equipments such as a host computer, an interface equipment, a reader, a printer and the like or to an apparatus including a single equipment such as a copying machine, facsimile machine or the like.

The present invention is applicable to a case that a storage medium storing the program codes of a software for realizing the functions of the above-described embodiment is supplied to a system or an apparatus and then a computer (or CPU or MPU) in the system or the apparatus reads and executes the program codes stored in the storage medium.

In this case, the program codes themselves read from the storage medium realize the functions of the above embodiments, and the storage medium storing such the program codes constitute the present invention.

The storage medium for supplying the program codes can be, for example, a floppy disk, a hard disk, an optical disk, a magnetooptical disk, a CD-ROM, a CD-R, a magnetic tape, a non-volatile memory card, a ROM or the like.

It is needless to say that the present invention also includes not only a case where the functions of the above embodiments are realized by the execution of the program codes read by the computer, but also a case where an OS (operating system) or the like functioning on the computer executes all the process or a part thereof according to the instructions of the program codes, thereby realizing the functions of the above embodiments.

Further, it is needless to say that the present invention includes a case where the program codes read from the storage medium are once stored in a memory provided in a function expansion board inserted in the computer or a function expansion unit connected to the computer, and a CPU or the like provided in the function expansion board or the function expansion unit executes all the process or a part thereof according to the instructions of the program codes, thereby realizing the functions of the above embodiments.

As explained above, the influence by the dirt in the shifting original reading can be reduced by varying the edge emphasis degree of the edge emphasis processing for the read image data in accordance with a fact that the original reading system is the fixing original reading or the shifting original reading.

As many apparently widely different embodiments of the present invention can be made without departing from the spirit and scope thereof, it, it is to be understood that the invention is not limited to the specific embodiments thereof expect as defined in the appended claims.

What is claimed is:

1. An image processing method, comprising:

a reading step of reading original images;

a processing step of executing edge emphasis processing to image data from said reading step; and a discrimination step of discriminating if an original reading system in said reading step is fixing original reading for reading an original image by fixing an original or shifting original reading for reading the original image by shifting the original, wherein said processing step varies edge emphasis degree in the edge emphasis processing for image data read in accordance with a discrimination result obtained in said discrimination step.

2. A method according to claim 1, wherein in a case where the original reading system is the shifting original reading, said processing step executes the edge emphasis processing of which the edge emphasis degree is lower than that of the fixing original reading.

3. A method according to claim 2, wherein a different edge emphasis filter is used in the edge emphasis processing executed in said processing step in accordance with a fact that the original reading system is the fixing original reading or the shifting original reading.

4. A method according to claim 1, wherein said discrimination step automatically detects if the original reading system is the fixing original reading or the shifting original reading.

5. An image processing apparatus, comprising:

reading means for reading original images to output image data; and processing means for executing edge emphasis processing to image data from said reading means, wherein said reading means reads originals by any one of original reading system of fixing original reading for reading an original image by fixing an original or shifting original reading for reading the original image by shifting the original, wherein said processing means varies edge emphasis degree in the edge emphasis processing for the image data which was read in accordance with a fact that the original reading system is the fixing original reading for reading the original image by fixing the original or the shifting original reading for reading the original image by shifting the original.

6. An apparatus according to claim 5, wherein in a case where the original reading system is the shifting original reading, said processing means executes the edge emphasis processing of which the edge emphasis degree is lower than that of the fixing original reading.

7. An apparatus according to claim 6, wherein said processing means uses a different edge emphasis filter in accordance with a fact that the original reading system is the fixing original reading or the shifting original reading.

8. An apparatus according to claim 5, further comprising detection means for automatically detecting if the original reading system is the fixing original reading or the shifting original reading.

* * * * *